United States Patent
Kamble et al.

(10) Patent No.: US 11,321,271 B2
(45) Date of Patent: *May 3, 2022

(54) HOST BASED NON-VOLATILE MEMORY CLUSTERING MECHANISM USING NETWORK MAPPED STORAGE

(71) Applicant: Kyndryl, Inc., New York, NY (US)

(72) Inventors: Keshav G. Kamble, Fremont, CA (US); Vijoy A. Pandey, San Jose, CA (US); Atul A. Tambe, Cupertino, CA (US)

(73) Assignee: Kyndryl, Inc., New York, NY (US)

( * ) Notice: Subject to any disclaimer, the term of this patent is extended or adjusted under 35 U.S.C. 154(b) by 436 days.

This patent is subject to a terminal disclaimer.

(21) Appl. No.: 16/033,121

(22) Filed: Jul. 11, 2018

(65) Prior Publication Data

US 2018/0322088 A1 Nov. 8, 2018

Related U.S. Application Data

(63) Continuation of application No. 14/606,947, filed on Jan. 27, 2015, now Pat. No. 10,061,743.

(51) Int. Cl.
*G06F 15/167* (2006.01)
*H04L 67/1097* (2022.01)
(Continued)

(52) U.S. Cl.
CPC ............ *G06F 15/167* (2013.01); *G06F 3/061* (2013.01); *G06F 3/067* (2013.01); *G06F 3/0632* (2013.01);
(Continued)

(58) Field of Classification Search
CPC .. H04L 67/06; H04L 67/1017; H04L 67/1095; H04L 67/1097; H04L 67/2842;
(Continued)

(56) References Cited

U.S. PATENT DOCUMENTS 6,148,377 A 11/2000 Carter et al.
10,061,743 B2 8/2018 Kamble et al.
(Continued)

FOREIGN PATENT DOCUMENTS

JP 2014130420 A 7/2014

OTHER PUBLICATIONS

International Search Report and Written Opinion from International Application No. PCT/EP2016/050685, dated Apr. 28, 2016.
(Continued)

*Primary Examiner* — Farzana B Huq
(74) *Attorney, Agent, or Firm* — Zilka-Kotab, P.C.

(57) ABSTRACT

In one embodiment, a method includes initiating cluster parameters that govern how a non-volatile memory (NVM) cluster functions and operates. Submission and completion queues of shared NVM on other nodes in the NVM cluster are mapped based on details of the shared NVM on the other nodes in the NVM cluster. The submission queue is configured to store commands to access the shared NVM according to a first-in-first-out (FIFO) scheme. The completion queue is configured to store completed commands after being processed through the submission queue. In another embodiment, a host-based data storage system includes NVM configured to store data. The host-based data storage system further includes a processor and logic integrated with and/or executable by the processor to perform the foregoing method.

10 Claims, 8 Drawing Sheets

(51) Int. Cl.
*H04L 65/611* (2022.01)
*G06F 3/06* (2006.01)
*G06F 13/28* (2006.01)
*G06F 9/50* (2006.01)

(52) U.S. Cl.
CPC ............... *G06F 9/50* (2013.01); *G06F 13/28* (2013.01); *H04L 65/4076* (2013.01); *H04L 67/1097* (2013.01)

(58) Field of Classification Search
CPC . H04L 49/35; H04L 63/1408; H04L 63/1425; H04L 69/14; H04L 69/16; H04L 69/166
USPC .................................. 709/212–214, 219, 250
See application file for complete search history.

(56) References Cited

U.S. PATENT DOCUMENTS

| | | | | |
|---|---|---|---|---|
| 2006/0045099 | A1* | 3/2006 | Chang | H04L 69/16 370/400 |
| 2014/0047166 | A1 | 2/2014 | Asnaashari et al. | |
| 2014/0052891 | A1* | 2/2014 | Zyulkyarov | G06F 9/3004 711/102 |
| 2014/0108715 | A1 | 4/2014 | Olbrich et al. | |
| 2015/0006663 | A1 | 1/2015 | Huang | |
| 2015/0248366 | A1* | 9/2015 | Bergsten | G06F 3/067 710/308 |
| 2015/0261434 | A1* | 9/2015 | Kagan | G06F 13/28 711/103 |
| 2016/0217104 | A1 | 7/2016 | Kamble et al. | |
| 2020/0218678 | A1* | 7/2020 | Prabhakar | G06F 13/385 |

OTHER PUBLICATIONS

Onufryk, P. "What's New in NVMe 1.1 and Future Directions," NVM Express, PMC-Sierra, Flash Memory Summit, Aug. 2013, pp. 1-26.
Kamble et al., U.S. Appl. No. 14/606,947, filed Jan. 27, 2015.
Non-Final Office Action from U.S. Appl. No. 14/606,947, dated Jun. 2, 2017.
Notice of Allowance from U.S. Appl. No. 14/606,947, dated Apr. 24, 2018.
Notice of Rejection from Japanese Application No. 2017-535644, dated May 28, 2019.
List of IBM Patents Or Patent Applications Treated As Related.

* cited by examiner

HOST BASED NON-VOLATILE MEMORY CLUSTERING MECHANISM USING NETWORK MAPPED STORAGE

TECHNICAL FIELD

The present invention relates to host based non-volatile memory, and more particularly, this invention relates to host based non-volatile memory clustering using network mapped storage.

BACKGROUND

Non-volatile memory (NVM) is a very useful memory type that may be employed in many modern applications due to its ability to retain information without power. This is particularly advantageous in mobile devices which rely on batteries for their sole source of power, as any power drain during off-times would diminish the usability of the devices. Furthermore, NVM has begun being used more and more in other, less obvious applications, such as network storage.

There are some desired access specifications for using NVM in today's demanding applications: 1) The NVM should be able to reach speeds similar to those which may be achieved using double data rate type three synchronous dynamic random-access memory (DDR3 SDRAM). 2) The NVM should be able to achieve one million input/output (I/O) operations per second (IOPS) or more, considered to be a benchmark for usability of memory in an enterprise network storage infrastructure. 3) The NVM should be able to achieve interconnect latency between 3 μs and 10 μs, also considered to be a benchmark for usability of memory in an enterprise network storage infrastructure. 4) The NVM should be able to achieve performance similar to peripheral component interconnect express (PCIe) serializer/deserializer (SerDes) lanes.

However, current methods of utilizing NVM, and particularly flash memory, are not able to achieve all of these desired access specifications. Some of the issues with implementation of NVM in the context of enterprise network storage includes discovering a way to provide seamless, high-performance transport of data in the network infrastructure, how to build a storage appliance capable of providing NVM-based storage, how to cluster together host-based solid state drives (SSDs) which utilize NVM, how to cluster together the host-based SSDs with central storage appliances in the network infrastructure, and how to achieve server-based and network-based virtualization of the NVM storage on the network.

Current implementations of NVM do not have the ability to interact with other elements of a network in a manner which allows the full performance of the NVM to be used in a network infrastructure.

SUMMARY

In one embodiment, a method includes initiating cluster parameters that govern how a non-volatile memory (NVM) cluster functions and operates. Submission and completion queues of shared NVM on other nodes in the NVM cluster are mapped based on details of the shared NVM on the other nodes in the NVM cluster. The submission queue is configured to store commands to access the shared NVM according to a first-in-first-out (FIFO) scheme. The completion queue is configured to store completed commands after being processed through the submission queue.

In another embodiment, a host-based data storage system includes NVM configured to store data. The host-based data storage system further includes a processor and logic integrated with and/or executable by the processor to perform the foregoing method.

According to another embodiment, a computer program product includes a computer readable storage medium having program instructions embodied therewith. The computer readable storage medium is not a transitory signal per se. The program instructions are executable by a computer to cause the computer to perform a method that includes multicasting cluster parameters of a non-volatile memory (NVM) cluster to other nodes of a NVM cluster, and mapping submission and completion queues of shared NVM on the other nodes in the NVM cluster based on details of the shared NVM on the other nodes in the NVM cluster. The submission queue is configured to store commands to access the shared NVM according to a first-in-first-out (FIFO) scheme. The completion queue is configured to store completed commands after being processed through the submission queue.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

According to one embodiment, access methods for using non-volatile memory (NVM) are provided that are useful in today's complicated and resource hungry applications. One such access method to NVM is a seamless, high-performance transport which provides for storage appliance builds, allows for clustering host based NVM storage devices, such as solid state drives (SSDs), provides for clustering host based NVM storage devices and central storage appliances, and provides server-based and network-based virtualization of NVM.

In one general embodiment, a system includes a first node, the first node including a first NVM configured to store data, a first memory controller connected to the first NVM via a NVM interface, a first network interface card (NIC) connected to the first memory controller, the first NIC being configured to communicate across a network, a first processor, and first logic integrated with and/or executable by the first processor, the first logic being configured to: initiate cluster parameters that govern how a NVM cluster will function and operate, multicast cluster parameters of the NVM cluster at predetermined intervals to any other node in the NVM cluster, receive a request from a second node for details of shared NVM on the first node, receive, from the second node, details of shared NVM on the second node, the details of the shared NVM on the second node including file locations in each shared NVM on the second node, send the details of the shared NVM on the first node to the second node, the details of the shared NVM on the first node including file locations in each shared NVM on the first node, and map submission and completion queues of the shared NVM on the second node to the first memory controller based on the details of the shared NVM on the second node, wherein the submission queue is configured to store commands to access the shared NVM on the second node according to a first-in-first-out (FIFO) scheme, and wherein the completion queue is configured to store completed commands after being processed through the submission queue.

In another general embodiment, a host-based data storage system includes NVM configured to store data, a memory controller connected to the NVM via a NVM interface, a NIC connected to the memory controller, the NIC being configured to communicate across a network, a processor, and logic integrated with and/or executable by the processor, the logic being configured to: initiate cluster parameters that govern how a NVM cluster will function and operate, multicast cluster parameters of the NVM cluster at predetermined intervals to any other node in the NVM cluster, and map submission and completion queues of any shared NVM on other nodes in the NVM cluster to the memory controller based on details of the shared NVM on the other nodes in the NVM cluster, wherein the submission queue is configured to store commands to access the shared NVM according to a FIFO scheme, and wherein the completion queue is configured to store completed commands after being processed through the submission queue.

According to another general embodiment, a network storage appliance includes a plurality of NVM storage devices configured to store data, a memory controller connected to the plurality of NVM storage devices via a NVM interface, a NIC connected to the memory controller, the NIC being configured to communicate across a network with other nodes in a NVM cluster via remote direct memory access (RDMA) over converged Ethernet (RoCE), a processor, and logic integrated with and/or executable by the processor, the logic being configured to: receive a multicast message that includes cluster parameters of a NVM cluster, the NVM cluster including one or more nodes having shared NVM accessible thereon, send, in response to receipt of the multicast message, a request for details of shared NVM on any other nodes in the NVM cluster, join the NVM cluster by initializing submission and completion queues of shared NVM on the network storage appliance, map the submission and completion queues of the shared NVM on the network storage appliance to the other nodes in the NVM cluster, and send details of the shared NVM on the network storage appliance to the other nodes in the NVM cluster, wherein the submission queue is configured to store commands to access the shared NVM according to a FIFO scheme, and wherein the completion queue is configured to store completed commands after being processed through the submission queue, receive details of shared NVM on the other nodes in the NVM cluster, and map the shared NVM on the other nodes in the NVM cluster to the memory controller based on the details of the shared NVM on the other nodes in the NVM cluster.

According to another general embodiment, a method includes initiating, using a first node having first NVM therein, cluster parameters that govern how a NVM cluster will function and operate, multicasting, using the first node, cluster parameters of the NVM cluster at predetermined intervals to any other node in the NVM cluster, receiving, at the first node, a request for details of shared NVM on the first node, receiving, at the first node, details of shared NVM on a second node, the details of the shared NVM on the second node including file locations in each shared NVM on the second node, sending the details of the shared NVM on the first node to the second node, the details of the shared NVM on the first node including file locations in each shared NVM on the first node, and mapping, using the first node, submission and completion queues of the shared NVM on the second node to the first node based on the details of the shared NVM on the second node, where the submission queue is configured to store commands to access the shared NVM on the second node according to a first-in-first-out (FIFO) scheme, and where the completion queue is configured to store completed commands after being processed through the submission queue.

In another general embodiment, a method includes receiving a multicast message that includes cluster parameters of a NVM cluster, the NVM cluster including one or more nodes having shared NVM accessible thereon, sending, in response to receipt of the multicast message, a request for details of shared NVM on any other nodes in the NVM cluster, joining the NVM cluster by initializing submission and completion queues of local shared NVM, mapping the submission and completion queues of the local shared NVM to the other nodes in the NVM cluster, and sending details of the local shared NVM to the other nodes in the NVM cluster, receiving details of shared NVM on the other nodes in the NVM cluster, and mapping the shared NVM on the other nodes in the NVM cluster based on the details of the shared NVM on the other nodes in the NVM cluster.

Figure 1:
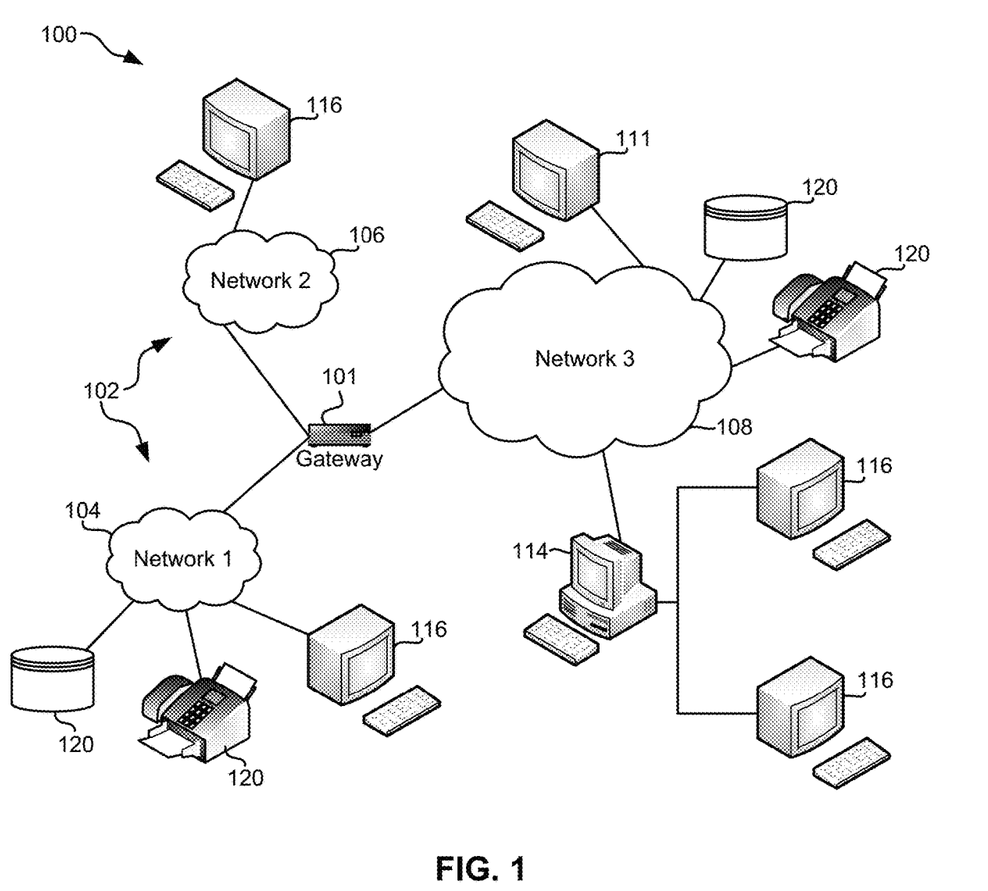
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local data storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, or a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
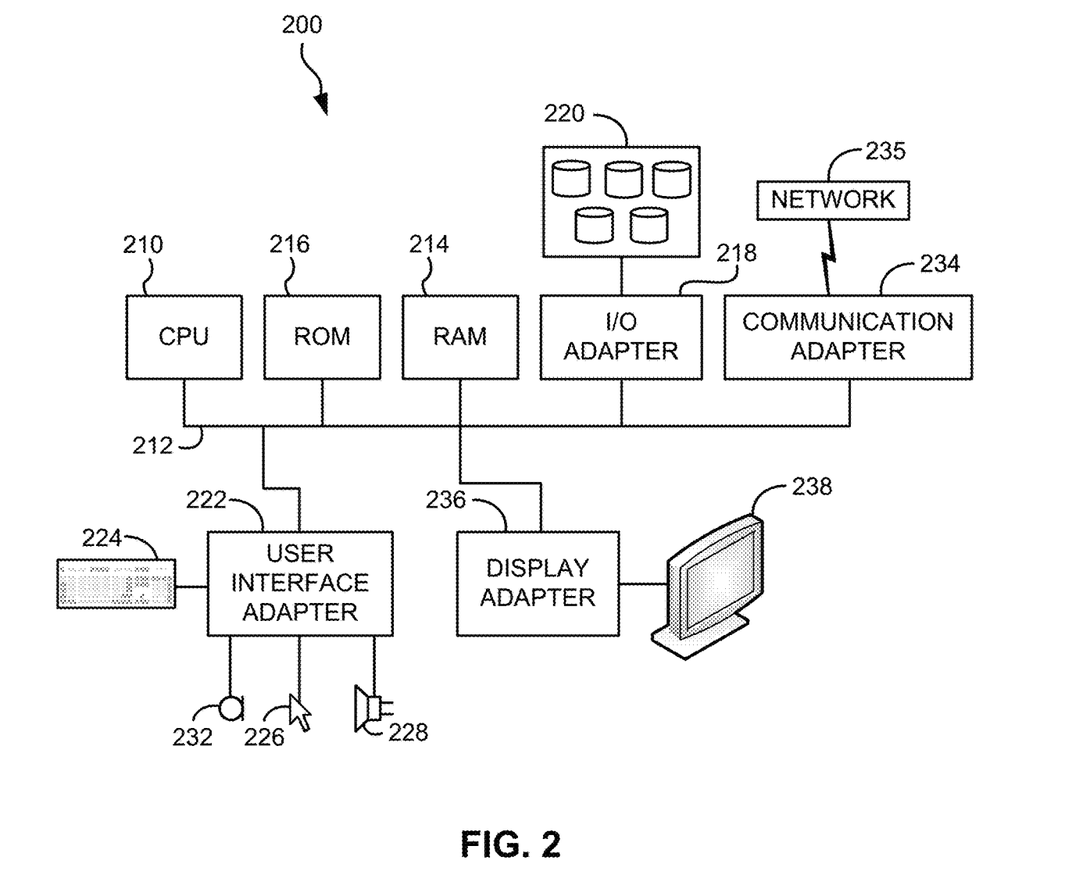
FIG. 2 shows a representative hardware environment of a processor system that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a processor system 200 having a central processing unit 210, such as a microprocessor, and a number of other units interconnected via a system bus 212, according to one embodiment.

The processor system 200 shown in FIG. 2 includes a Random Access Memory (RAM) 214, Read Only Memory (ROM) 216, an I/O adapter 218 for connecting peripheral devices such as storage subsystem 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the processor system 200 to a communication network 235 (e.g., a data processing network) and a display adapter 236 for connecting the bus 212 to a display device 238.

The processor system 200 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
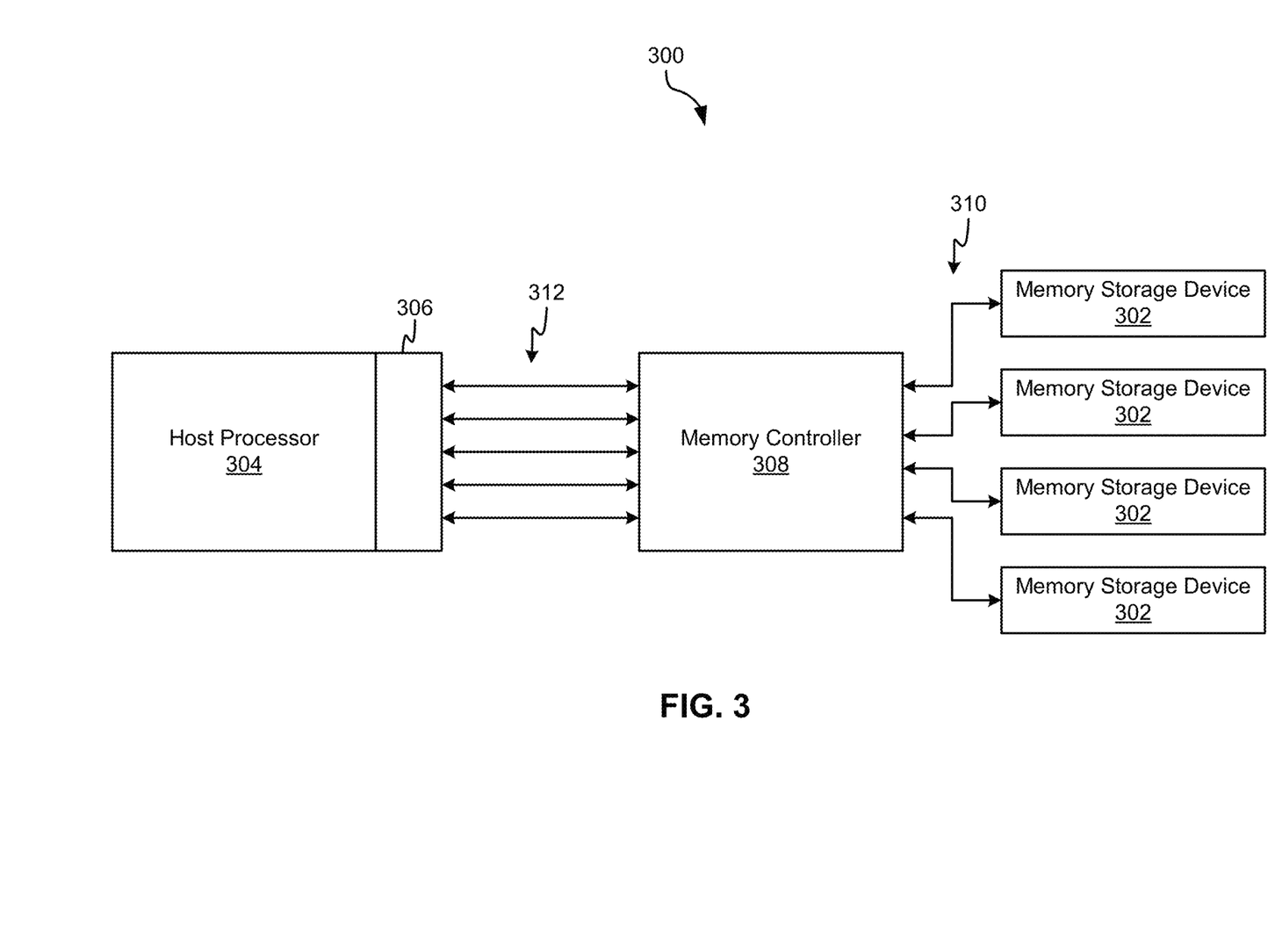
FIG. 3 shows a host-based data storage system in one embodiment.

Now referring to FIG. 3, a host-based data storage system 300 is shown according to one embodiment. The host-based data storage system 300 can have one or more NVM storage devices 302, such as NVM express (NVMe) storage devices, SSDs, Flash drives, etc. Each NVM storage device 302 can have NVM of a type known in the art, such as Flash memory, read only memory (ROM), ferroelectric random access memory (FRAM), programmable read only memory (PROM), non-volatile random access memory (NVRAM), etc. In one embodiment, a host processor 304 can be configured to communicate with a memory controller 308, which provides for and supports clustering of the NVM on the various NVM storage devices 302.

The host processor 304 can be configured to communicate with the memory controller 308 using a driver 306 of the host processor 304, via a plurality of peripheral component interconnect express (PCIe) lanes 312, such as multiples of eight such lanes, e.g., 16 lanes, 32 lanes, etc. The host processor 304 can have one or more central processing units (CPUs), or some other suitable processor type known in the art.

The memory controller 308 can communicate with the various NVM storage devices 302 via a NVM interface 310, of a type known in the art. The memory controller 308 can be implemented as a hardware module, block, and/or processor, such as an ASIC, FPGA, etc. Also, the memory controller 308 can be configured to communicate via one or more communication protocols suitable for storing and retrieving data from the NVM storage devices 302, such as a remote direct memory access (RDMA) over converged Ethernet (RoCE), coherent accelerator processor interface (CAPI) over RoCE, CAPI over Ethernet, NVMe over Ethernet, etc. CAPI is a protocol for communicating with local SSDs, and NVMe is a protocol for transmission of data similar to PCIe for local connected storage.

Other communication protocols can also be utilized in the context of the data storage system 300, such as Fiber Channel (FC), FC over Ethernet (FCoE), Infiniband, Internet Small Computer System Interface (iSCSI), Transport Control Protocol/Internet Protocol (TCP/IP), PCIe, etc., and/or any combination thereof.

In order to provide clustering of NVM (via NVMe, CAPI, etc.), operation queues, such as submission and/or completion queues, can be mapped for remote memory access. Any type of memory access protocols can be utilized in this embodiment. In this way, distributed memory (or disk) clustering can be provided in a more direct and efficient manner than is currently possible.

Figure 4:
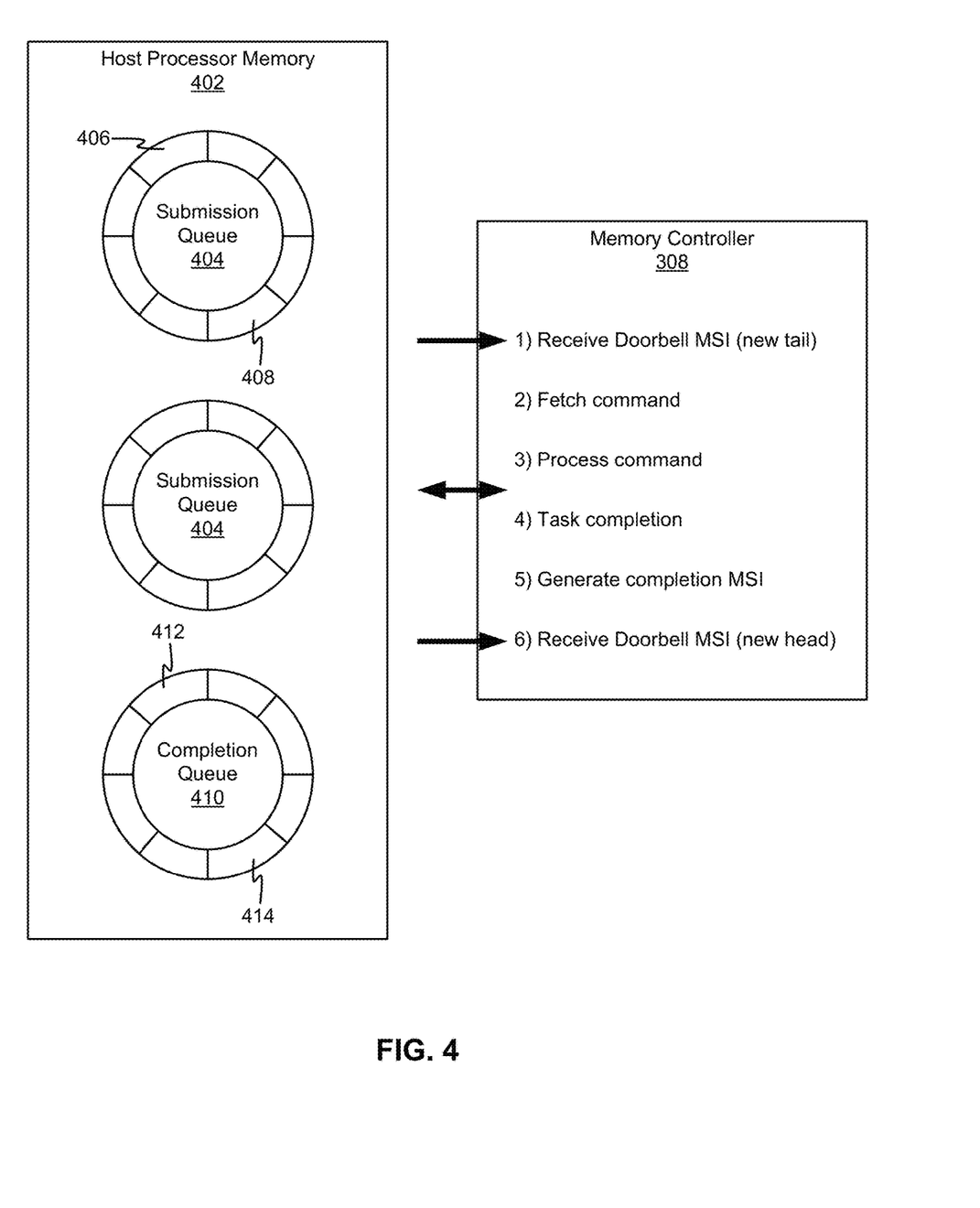
FIG. 4 shows operation of a host-based non-volatile memory (NVM) storage system according to one embodiment.

Now referring to FIG. 4, operation of a host-based NVM storage system is shown according to one embodiment. The host processor memory 402 can be connected to the host processor, and can have a plurality of buffers, and particularly one or more ring buffers of a size configured to store a plurality of commands without pushing any commands out of the buffer during a typical downtime, service interruption, burst of commands, etc. In one embodiment, the host processor memory 402 can have one or more submission queue ring buffers 404 (two such ring buffers are shown, but any number may be used) and one or more completion queue ring buffers 410 (one such ring buffer is shown, but any number may be used). Other types of buffers can be used for the submission queue and/or completion queue, such as a linear buffer or some other buffer known in the art.

The submission queue ring buffer 404 can be configured to store commands that can be executed according to a first-in-first-out (FIFO) scheme, or some other desired in/out scheme known in the art. The submission queue ring buffer 404 can store the commands from a head 406 to a tail 408, with additional commands being placed at the head 406 until no more commands will fit in the queue. Commands are pulled from the submission queue ring buffer 404 from the tail, in one embodiment.

The completion queue ring buffer 410 can store the completed commands after being processed through the submission queue ring buffer 404. The completion queue ring buffer 410 can also store commands that have been executed according to a FIFO scheme, or some other desired in/out scheme known in the art. Furthermore, the completion queue ring buffer 410 can store the completed commands from a head 412 to a tail 414, with additional completed commands being placed in front of the head 412.

The memory controller 308 can be configured to receive an indication that a new command has been added to the submission queue ring buffer 404. In one embodiment, the indication can be a doorbell message signaled interrupt (MSI). Then, the memory controller 308 can fetch the command from the submission queue ring buffer 404, process the command until completion, and send an indication to the host processor that the command has been completed (such as via a completion MSI). Then, the memory controller 308 can receive an indication of the process completion being acknowledged, such as via a doorbell MSI (indicating a new head) in the completion queue ring buffer 410, according to one embodiment.

Figure 5:
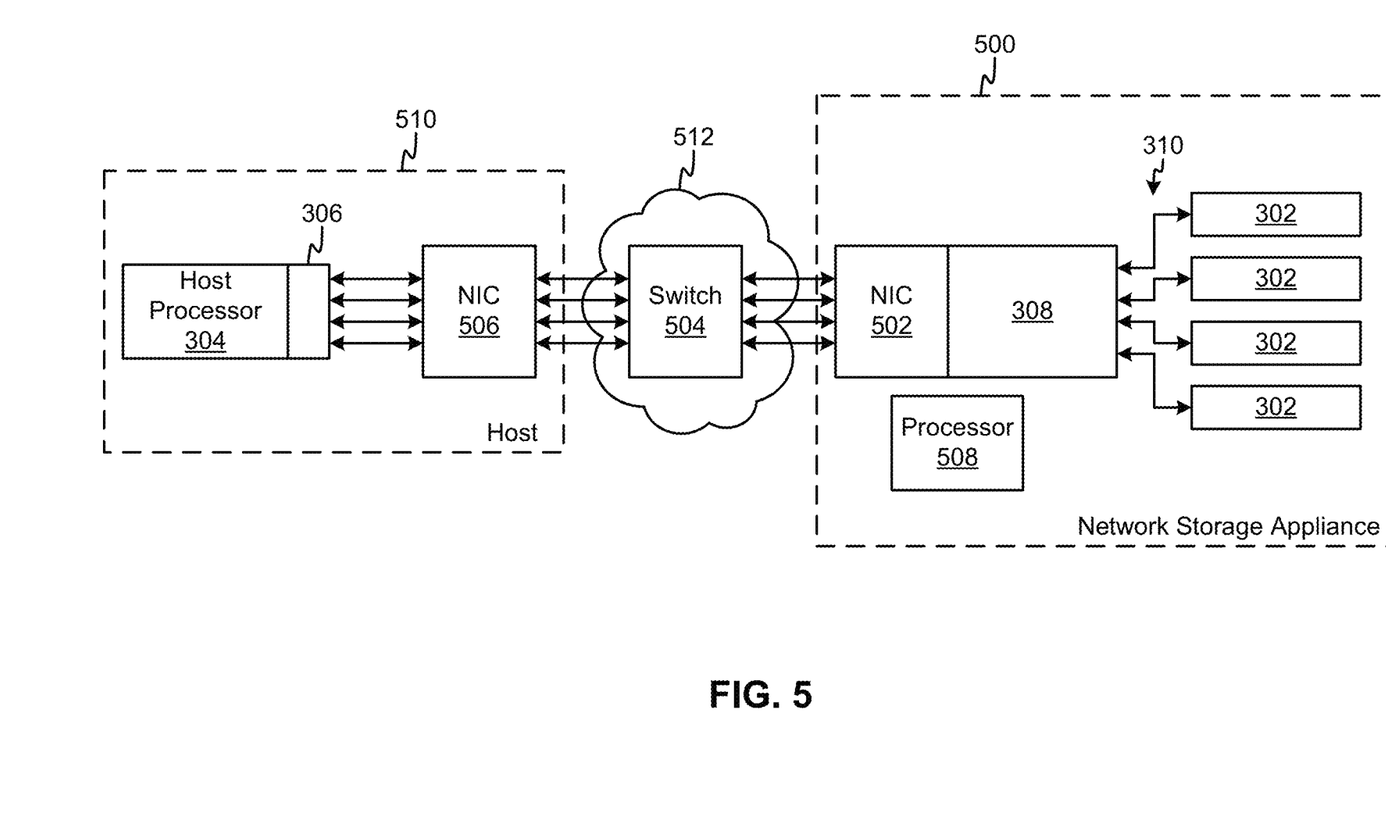
FIG. 5 shows a network storage appliance according to one embodiment.

A network storage appliance 500 is shown in FIG. 5, according to one embodiment, that can be connected via a network 512 to a host 510. The network storage appliance 500 can have a network interface card (NIC) 502 which can be configured to communicate across network 512. Network 512 can have one or more switches 504. The one or more switches 504 can be any combination of physical switches, virtual switches, distributed switches, etc., that are configured to perform at least one of: priority flow control (PFC), enhanced transmission selection (ETS), quantized congestion notification (QCN). In one embodiment, the one or more switches 504 in a path between the network storage appliance 500 and the host 510 can be configured to perform all the flow protocols listed above. Furthermore, each of the switches 504 in the path between the network storage appliance 500 and the host 510 can be configured to communicate via RoCE, and/or some or all of the other communication protocols listed above.

The network storage appliance 500 can have some or all of the components of the host-based data storage system, as shown in FIG. 3. As shown in FIG. 5, the network storage appliance 500 can have NIC 502 which can be configured to communicate across the network 512, a processor 508 for controlling operation of the network storage appliance 500, memory controller 308, and plurality of NVM storage devices 302 that the memory controller 308 can communicate with via NVM interface 310.

The host 510 can have a NIC 506, which can be configured to communicate across the network 512 and which can be connected to driver 306 for communicating via one or more of the various communication protocols listed above, in one embodiment. Driver 306 can be controlled by the processor 304.

In one embodiment, both NIC 502 and NIC 506 can be configured to communicate via RoCE across the network 512 via the one or more switches 504, such that each of the switches 504 in the path between the network storage appliance 500 and the host 510 can be configured to communicate via RoCE.

In this way, the host 510 can be configured to access the NVM on the various NVM storage devices 302 in the network storage appliance 500. When the network 512 utilizes Ethernet connections, any of 10/40/100 Gbps are possible, depending on the actual configuration, with consistent low latency, converged Ethernet capability (for lossless functionality), and RoCE support. This is a ubiquitous, agile, scalable, and cost competitive solution for direct access to the NVM on the network storage appliance 500.

In one embodiment, a network storage appliance 500 can have a plurality of NVM storage devices 302 that can be configured to store data, a memory controller 308 that can be connected to the plurality of NVM storage devices 302 via a NVM interface 310, a NIC 502 that can be connected to the memory controller 308 and that can be configured to communicate across a network 512 with other nodes in a NVM cluster via RoCE or some other suitable protocol known in the art, a processor 508, and logic that can be integrated with and/or executable by the processor 508 and that can be configured to: receive a multicast message that includes cluster parameters of a NVM cluster, the NVM cluster including one or more nodes having shared NVM accessible thereon; send, in response to receipt of the multicast message, a request for details of shared NVM on any other nodes in the NVM cluster; join the NVM cluster by initializing submission and completion queues of shared NVM on the network storage appliance 500, mapping the submission and completion queues of the shared NVM on the network storage appliance 500 to the other nodes in the NVM cluster, sending details of the shared NVM on the network storage appliance 500 to the other nodes in the NVM cluster; receiving details of shared NVM on the other nodes in the NVM cluster; and mapping the shared NVM on the other nodes in the NVM cluster to the memory controller 308 based on the details of the shared NVM on the other nodes in the NVM cluster. The submission queue can be configured to store commands to access the shared NVM on the other node according to a first-in-first-out (FIFO) scheme, and wherein the completion queue can be configured to store completed commands after being processed through the submission queue.

Figure 6:
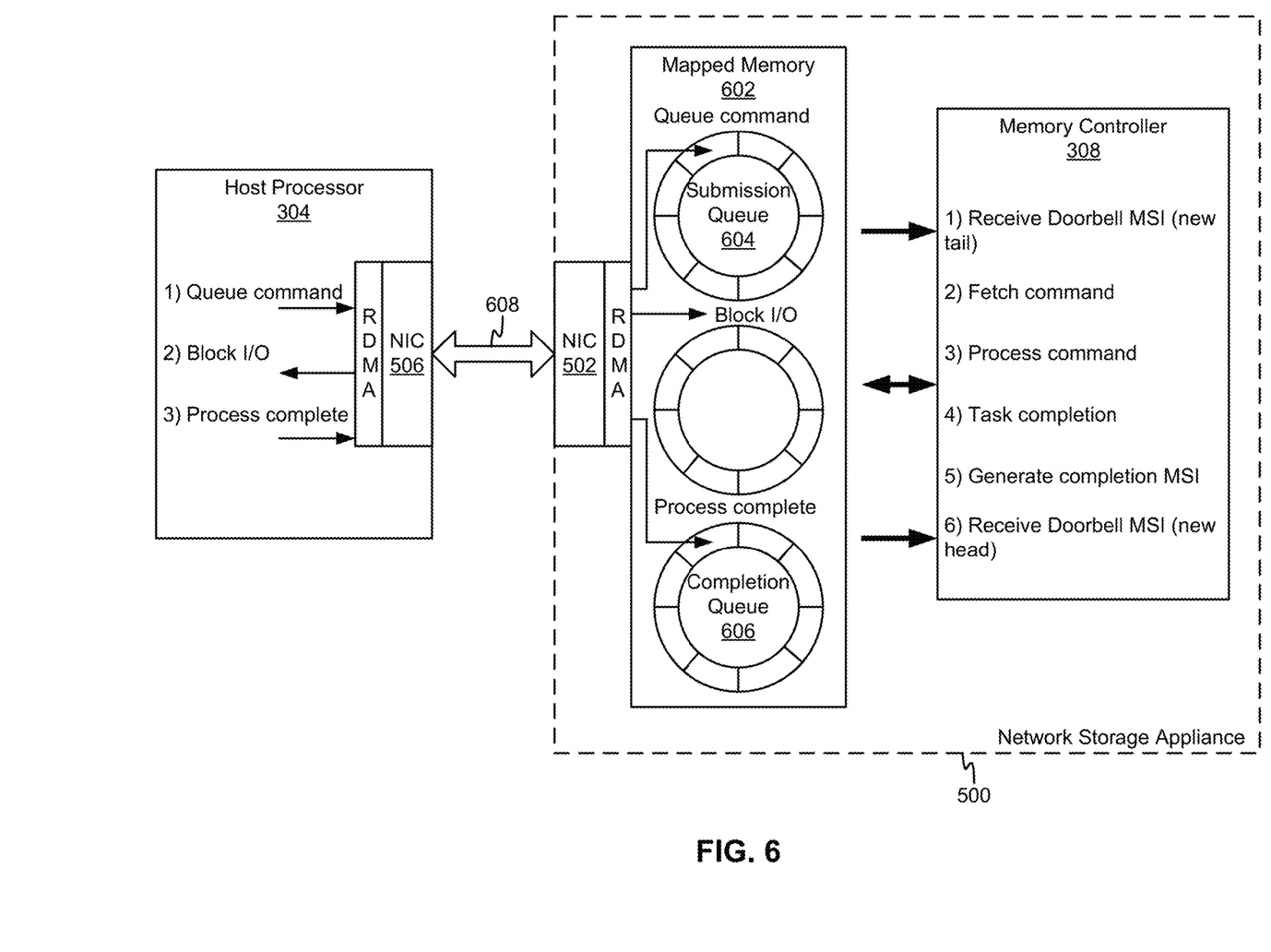
FIG. 6 shows operation of a network storage appliance according to one embodiment.

Operation of a network storage appliance 500 is shown according to one embodiment in FIG. 6. As shown, a host processor 304 can issue a queue command, which can be communicated across the network (as indicated by arrow 608) via a NIC 506, and can be received on the other end by a NIC 502, and then can be RDMA'd into a submission queue ring buffer 604. This is possible because, according to one embodiment, the host processor 304 can be RDMA mapped to the mapped memory 602 of the network storage appliance 500, such that queue commands from the host processor 304 can be RDMA'd into the submission queue ring buffer 604 without other processing being required.

In order for this operation to be successful and repeatable, in one embodiment, the communication 608 across the network can be supported by at least RoCE, PFC, and QCN.

Then, the memory controller 308 can receive an indication that a new command has been added to the submission queue ring buffer 604. In one embodiment, the indication can be a doorbell MSI. Next, the memory controller 308 can fetch the command from the submission queue ring buffer

604, process the command until completion, and send an indication to the host processor 304 that the command has been completed (such as via a completion MSI). Then, the memory controller 308 can receive an indication of the process completion being acknowledged, such as via a doorbell MSI (indicating a new head) in the completion queue ring buffer 606, according to one embodiment.

Figure 7:
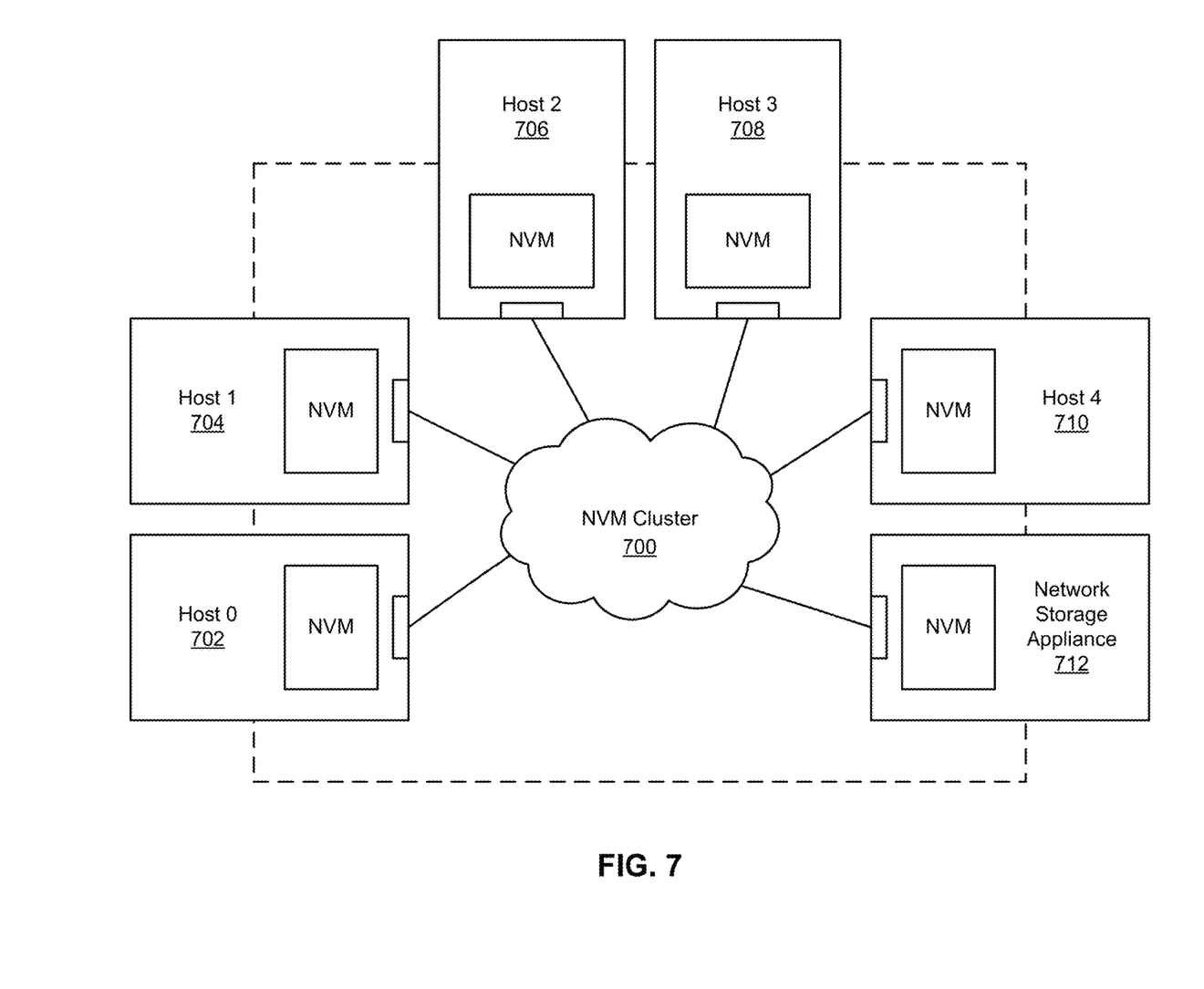
FIG. 7 shows clustering of host-based NVM storage according to one embodiment.

Now referring to FIG. 7, clustering of host-based NVM storage is shown according to one embodiment. As shown, a plurality of host-based NVM can be included in a NVM cluster 700, with each host, e.g., host 0 702, host 1 704, host 2 706, host 3 708, host 4 710, etc., managing its own local NVM and providing access thereto to the other members of the NVM cluster 700. Similarly, any network storage appliances 712 can be configured to manage their own local NVM and provide access thereto to the other members of the NVM cluster 700. This NVM cluster 700 can include any number of nodes. The nodes of the NVM cluster 700 can include one or more network storage appliances, one or more host-based NVM, and/or any combination thereof. This has the advantage of providing seamless and fast access to the data stored on the shared NVM in the NVM cluster 700 to all authorized components in the network.

In order to achieve this NVM cluster 700, in one embodiment, the following operational steps can be followed to get the NVM cluster 700 up and running.

1) A first node (e.g., host 0 702) boots and initiates cluster parameters that govern how the NVM cluster 700 will function and operate.

2) The first node multicasts cluster details at predetermined intervals to any other node in the NVM cluster 700. The cluster details may include policies of access (for example, how and who is allowed to access any information stored to the various NVM of the NVM cluster 700). This provides a way to limit access to certain data on shared NVM. This restricts access to this data so that unauthorized components are not able to access this restricted data.

3) A second node boots (e.g., any of hosts 1-5), and the second node receives local cluster parameters from a local disk file (e.g., a cluster configuration file). These local cluster parameters may include what to listen for in the multicast message from the first node.

4) The second node then requests information from all member nodes in the NVM cluster 700, which at present time the only member node is the first node, but the second node does not know this and so makes this request for information. The request is made within the interval, as the second node would receive the information from the first node at the interval, and this request may become unnecessary.

5) The second node listens for and receives the multicast message from the first node.

6) The second node, in response to receipt of the multicast message from the first node, requests file locations and details of shared memories on the first node, which may be provided in file accessible index(es), in one approach.

7) The second node joins the NVM cluster 700 by initializing its own submission and completion queues, maps its local NVM storage (the submission and completion queues) via RDMA to the other nodes in the NVM cluster 700, and provides its own NVM details, such as a RoCE NIC address to access the local NVM of the second node. This provides for fast and reliable access to the shared NVM on other nodes of the cluster.

8) The first node receives the NVM details from the second node, maps the submission and completion queues of the second node in RDMA, and provides NVM details of the first node to the second node. Other specific operations are also possible when setting up a NVM cluster 700 which utilizes specific sharing limitations, time constraints, access constraints, etc., and this information is also shared at this time.

9) At this point, the NVM cluster 700 includes two nodes, and the NVM of each node is visible to the other nodes.

Now, any node in the NVM cluster 700 is able to send remote access requests to other nodes to access the local NVM of the other node. These remote access requests can be stored in the local submission queue of the other node, processed as described previously, and then in response to the operation being completed, indicated back to the initiating node, with any information, data, confirmation, etc., that is appropriate for the particular remote access request. This has the advantage of providing seamless and fast access to the data stored on other shared NVM in the network. However, a local host has no visibility to remote access requests for NVM of the local host, and instead this functionality is provided by the NVM controller.

In another embodiment, a host-based storage and/or network storage appliance can have one or more access-restricted queues, which are only accessible by certain, pre-authorized entities in the network. An exchange of information can be made between a remote entity wishing to access the one or more access-restricted queues, in order to determine whether to allow access or not. These one or more access-restricted queues may be shared via RDMA, in one approach. This has the advantage of limiting access to certain shared NVM in the network.

Figure 8:
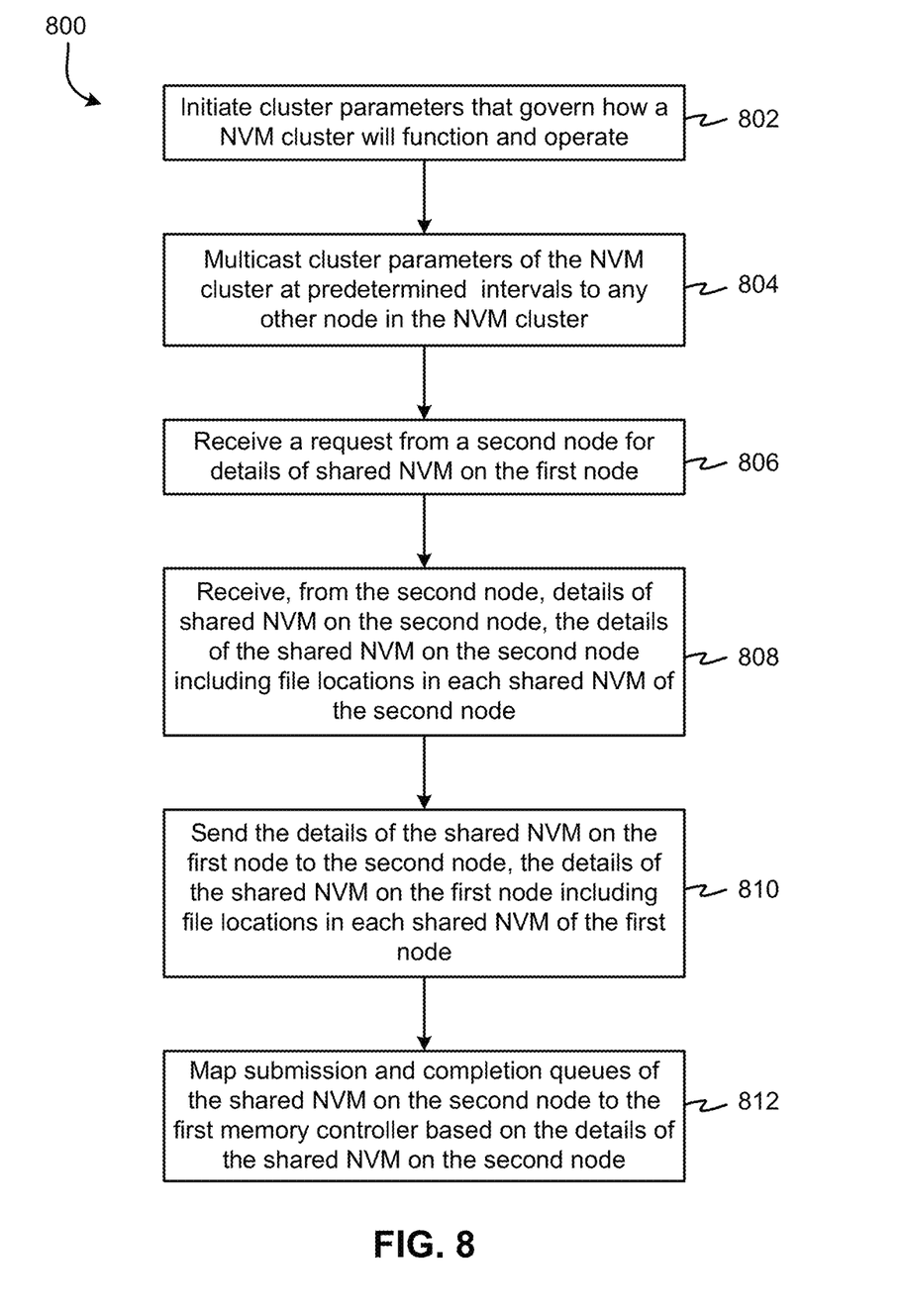
FIG. 8 shows a flowchart of a method, according to one embodiment.

Now referring to FIG. 8, a method 800 is shown for providing clustering of NVM, according to one embodiment. In operation 802, cluster parameters that govern how a NVM cluster will function and operate are initiated using a first node.

The first node may include, in one embodiment, a first NVM that can be configured to store data; a first memory controller that can be connected to the first NVM via a NVM interface; a first NIC that can be connected to the first memory controller and that can be configured to communicate across a network; a first processor; and first logic that can be integrated with and/or executable by the first processor. The first logic can be configured to execute method 800 in one embodiment.

In operation 804, cluster parameters of the NVM cluster can be multicast across the network at predetermined intervals to any other node in the NVM cluster, so that these other nodes can be made aware of the existence of the NVM cluster.

In operation 806, a request can be received from a second node for details of shared NVM on the first node. Not all NVM of the first node must be configured to be shared, and therefore the first node can be configured to determine which portion of the first NVM is to be shared, which is referred to as shared NVM on the first node.

In operation 808, details of shared NVM on the second node can be received at the first node from the second node. The details of the shared NVM on the second node can include file locations in each shared NVM on the second node, so that the file locations can be mapped into the first memory controller of the first node.

In operation 810, the details of the shared NVM on the first node can be sent to the second node. The details of the shared NVM on the first node can include file locations in each shared NVM on the first node so that the file locations can be mapped into the second memory controller of the second node.

In operation 812, submission and completion queues of the shared NVM on the second node can be mapped to the first memory controller based on the details of the shared NVM on the second node. The submission queue can be configured to store commands to access the shared NVM on the second node according to a FIFO scheme, and the completion queue can be configured to store completed commands after being processed through the submission queue.

This allows for access across the NVM cluster to the shared memories of all nodes in the NVM cluster.

In a further embodiment, method 800 can include receiving local cluster parameters from a local cluster configuration file; receiving a multicast message including the cluster parameters of the NVM cluster; sending, in response to receipt of the multicast message from the first node, the request to the first node for details of the shared NVM on the first node; joining the NVM cluster by initializing submission and completion queues of the shared NVM on the second node, mapping the submission and completion queues of the shared NVM on the second node to the other nodes in the NVM cluster, sending details of the shared NVM on the second node to the first node; receiving the details of the shared NVM on the first node; and mapping the shared NVM on the first node to the second memory controller based on the details of the shared NVM on the first node.

In one embodiment, the cluster details can include policies of access for data stored to the shared NVM on the first node. In this way, restricted access files can be indicated and other nodes in the NVM may not have access, or may require special privileges to access the restricted content, as would be understood by one of skill in the art.

In another embodiment, the method 800 can include receiving a request from the second node for the cluster details prior to multicasting the cluster details at the predetermined intervals. This allows the first node to be made aware of the presence of the second node before blinding broadcasting the cluster details.

In one approach, the submission and completion queues of the shared NVM on the second node can be mapped to the first memory controller using RDMA. Furthermore, the details of the shared NVM on the second node can include a RoCE NIC address of the second node that is used to access the shared NVM on the second node by any other node in the NVM cluster.

In addition, the shared NVM on the first node and the shared NVM on the second node can be accessible to other nodes in the NVM cluster via at least one of: CAPI and NVMe.

Any suitable NVM can be used in any of the nodes in the NVM cluster, including those described herein and others known in the art.

In a further embodiment, method 800 can include sending data from the shared NVM on the first node to the second node via RDMA using at least one of: NVMe over Ethernet and CAPI over Ethernet; and performing operations on the submission and completion queues of the shared NVM on the second node via RoCE, the operations including at least one of accessing data, accessing instructions, queuing data, and queuing instructions.

The NVM cluster can also include one or more network storage appliances, and/or other network storage devices which include NVM as would be known to one of skill in the art.

The access methods of NVM presented herein according to various embodiments allows for low and consistent latency Ethernet transport for data storage on non-volatile memory, reduce processor wait time and improve application performance, can be included in a scalable NVM storage appliance, allow for clustering, provide storage virtualization, and reduce the cost of deployment over current access methods.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method, comprising:
    initiating cluster parameters that govern how a non-volatile memory (NVM) cluster functions and operates;
    multicasting the cluster parameters of the NVM cluster to the other nodes in the NVM cluster in response to initiating the cluster parameters; and
    mapping submission and completion queues of shared NVM on other nodes in the NVM cluster based on details of the shared NVM on the other nodes in the NVM cluster,
    wherein the submission queue is configured to store commands to access the shared NVM according to a first-in-first-out (FIFO) scheme,
    wherein the completion queue is configured to store completed commands after being processed through the submission queue, and
    wherein submission and completion queues of the shared NVM on the other nodes in the NVM cluster are mapped to a memory controller using remote direct memory access (RDMA),
    wherein the details of the shared NVM on the other nodes in the NVM cluster include a RDMA over converged Ethernet (RoCE) network interface card (NIC) address of the other nodes in the NVM cluster that is used to access the shared NVM on the other nodes in the NVM cluster by other nodes in the NVM cluster.

2. The method as recited in claim 1, wherein local shared NVM is accessible to the other nodes in the NVM cluster via at least one protocol selected from the group consisting of: coherent accelerator processor interface (CAPI) and NVM express (NVMe).

3. The method as recited in claim 1, comprising:
sending data from local shared NVM to at least one of the other nodes in the NVM cluster via remote direct memory access (RDMA) using at least one protocol selected from the group consisting of: NVM express (NVMe) over Ethernet and coherent accelerator processor interface (CAPI) over Ethernet; and
performing operations on submission and completion queues of the shared NVM on the other nodes in the NVM cluster via RDMA over converged Ethernet (RoCE), the operations comprising at least one operation selected from the group consisting of: accessing data, accessing instructions, queuing data, and queuing instructions.

4. A host-based data storage system, comprising:
non-volatile memory (NVM) configured to store data;
a processor; and
logic integrated with and/or executable by the processor, the logic being configured to:
  initiate cluster parameters that govern how a NVM cluster functions and operates;
  multicast the cluster parameters of the NVM cluster to the other nodes in the NVM cluster in response to initiating the cluster parameters; and
  map submission and completion queues of shared NVM on other nodes in the NVM cluster based on details of the shared NVM on the other nodes in the NVM cluster,
  wherein the submission queue is configured to store commands to access the shared NVM according to a first-in-first-out (FIFO) scheme,
  wherein the completion queue is configured to store completed commands after being processed through the submission queue, and
  wherein submission and completion queues of the shared NVM on the other nodes in the NVM cluster are mapped to a memory controller using remote direct memory access (RDMA)
  wherein the details of the shared NVM on the other nodes in the NVM cluster include a remote direct memory access (RDMA) over converged Ethernet (RoCE) network interface card (NIC) address of the other nodes in the NVM cluster that is used to access the shared NVM on the other nodes in the NVM cluster by any other node in the NVM cluster.

5. The host-based data storage system as recited in claim 4, wherein shared NVM on the host-based data storage system is accessible to the other nodes in the NVM cluster via at least one protocol selected from the group consisting of: coherent accelerator processor interface (CAPI) and NVM express (NVMe).

6. The host-based data storage system as recited in claim 4, wherein the logic is configured to:
send data from shared NVM on the host-based data storage system to at least one of the other nodes in the NVM cluster via remote direct memory access (RDMA) using at least one protocol selected from the group consisting of: NVM express (NVMe) over Ethernet and coherent accelerator processor interface (CAPI) over Ethernet; and
perform operations on submission and completion queues of the shared NVM on the other nodes in the NVM cluster via RDMA over converged Ethernet (RoCE), the operations comprising at least one operation selected from the group consisting of: accessing data, accessing instructions, queuing data, and queuing instructions.

7. A computer program product, the computer program product comprising a computer readable storage medium having program instructions embodied therewith, the program instructions executable by a computer to cause the computer to perform a method comprising:
  initiating cluster parameters that govern how a non-volatile memory (NVM) cluster functions and operates;
  multicasting cluster parameters of a NVM cluster to other nodes of a NVM cluster in response to initiating the cluster parameters; and
  mapping submission and completion queues of shared NVM on the other nodes in the NVM cluster based on details of the shared NVM on the other nodes in the NVM cluster,
  wherein the submission queue is configured to store commands to access the shared NVM according to a first-in-first-out (FIFO) scheme,
  wherein the completion queue is configured to store completed commands after being processed through the submission queue, and
  wherein submission and completion queues of the shared NVM on the other nodes in the NVM cluster are mapped to a memory controller using remote direct memory access (RDMA),
  wherein the details of the shared NVM on the other nodes in the NVM cluster include a RDMA over converged Ethernet (RoCE) network interface card (NIC) address of the other nodes in the NVM cluster that is used to access the shared NVM on the other nodes in the NVM cluster by other nodes in the NVM cluster.

8. The computer program product as recited in claim 7, wherein local shared NVM is accessible to the other nodes in the NVM cluster via at least one protocol selected from the group consisting of: coherent accelerator processor interface (CAPI) and NVM express (NVMe).

9. The computer program product as recited in claim 7, comprising program instructions for:
sending data from local shared NVM to at least one of the other nodes in the NVM cluster via remote direct memory access (RDMA) using at least one protocol selected from the group consisting of: NVM express (NVMe) over Ethernet and coherent accelerator processor interface (CAPI) over Ethernet; and
performing operations on submission and completion queues of the shared NVM on the other nodes in the NVM cluster via RDMA over converged Ethernet (RoCE), the operations comprising at least one operation selected from the group consisting of: accessing data, accessing instructions, queuing data, and queuing instructions.

10. The method as recited in claim 3, wherein the data from local shared NVM is sent to at least one of the other nodes in the NVM cluster via remote direct memory access (RDMA) using (CAPI) over Ethernet.

* * * * *